J. H. BRUNINGA AND H. H. REISS.
FASTENER AND SLUG INSERTING MACHINE.
APPLICATION FILED NOV. 15, 1918.
1,394,468.
Patented Oct. 18, 1921.
7 SHEETS—SHEET 5.
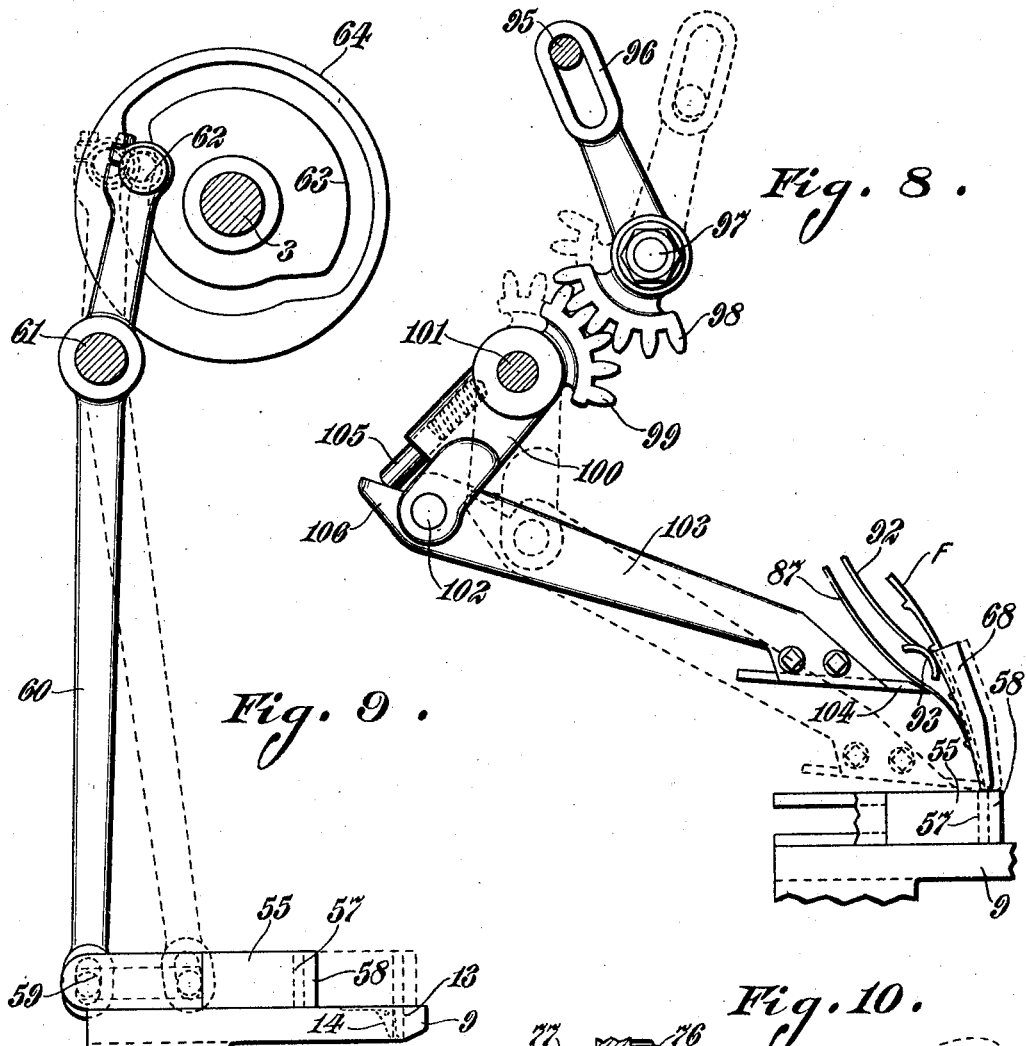
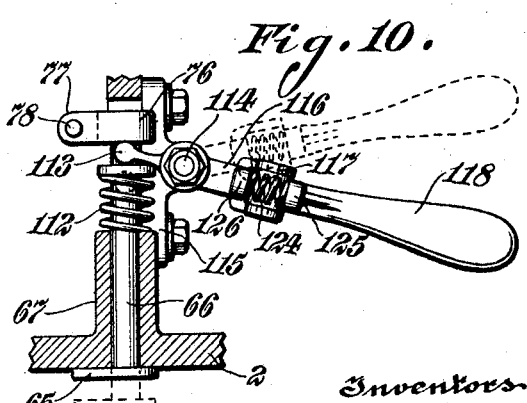
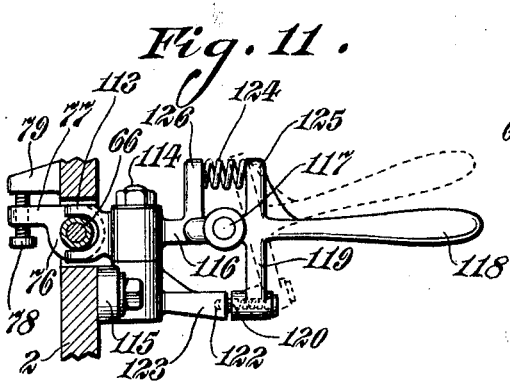
Inventors:
JOHN H. BRUNINGA and HARRY H. REISS,
By John H. Bruninga
Their Attorney

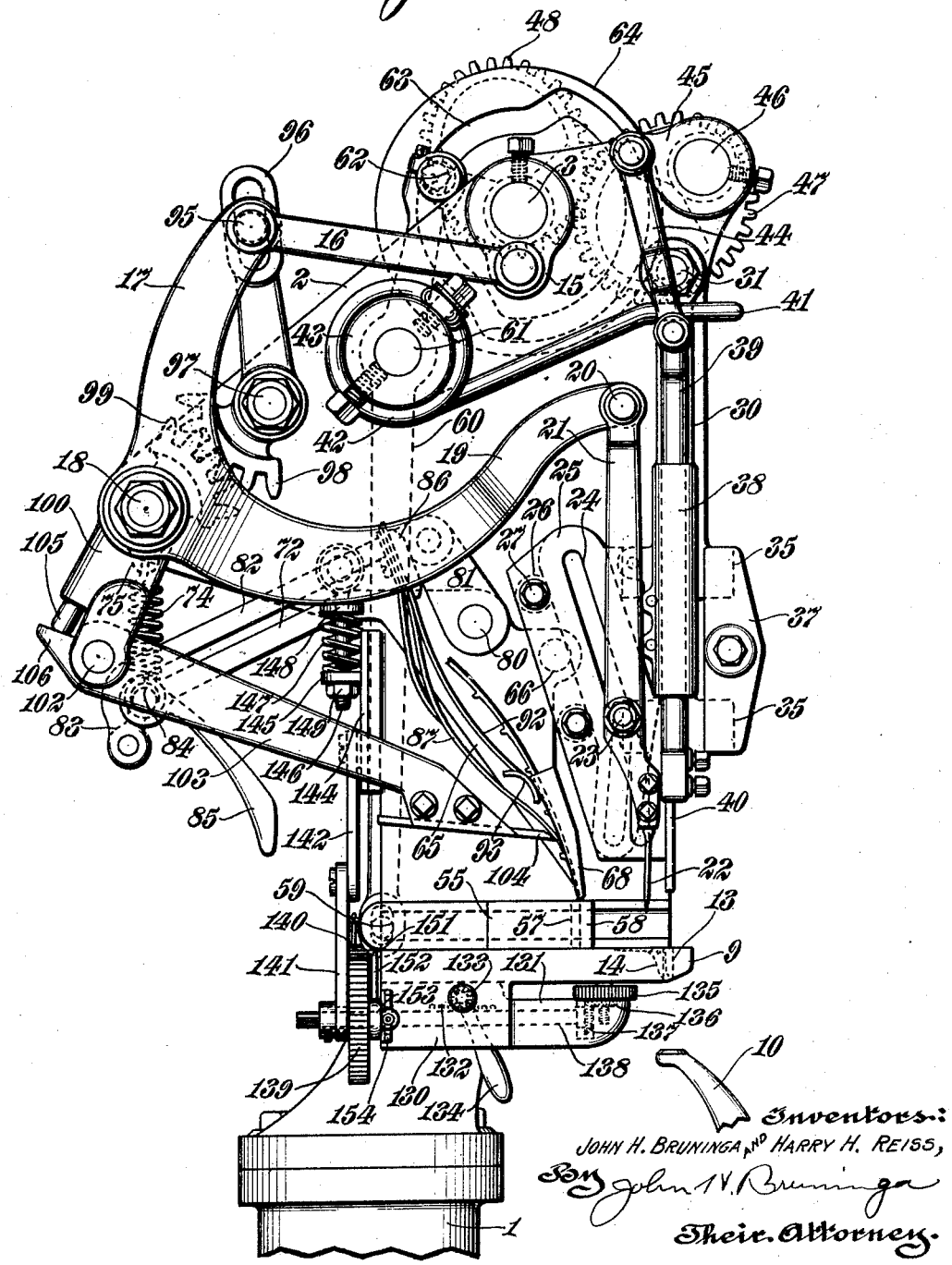

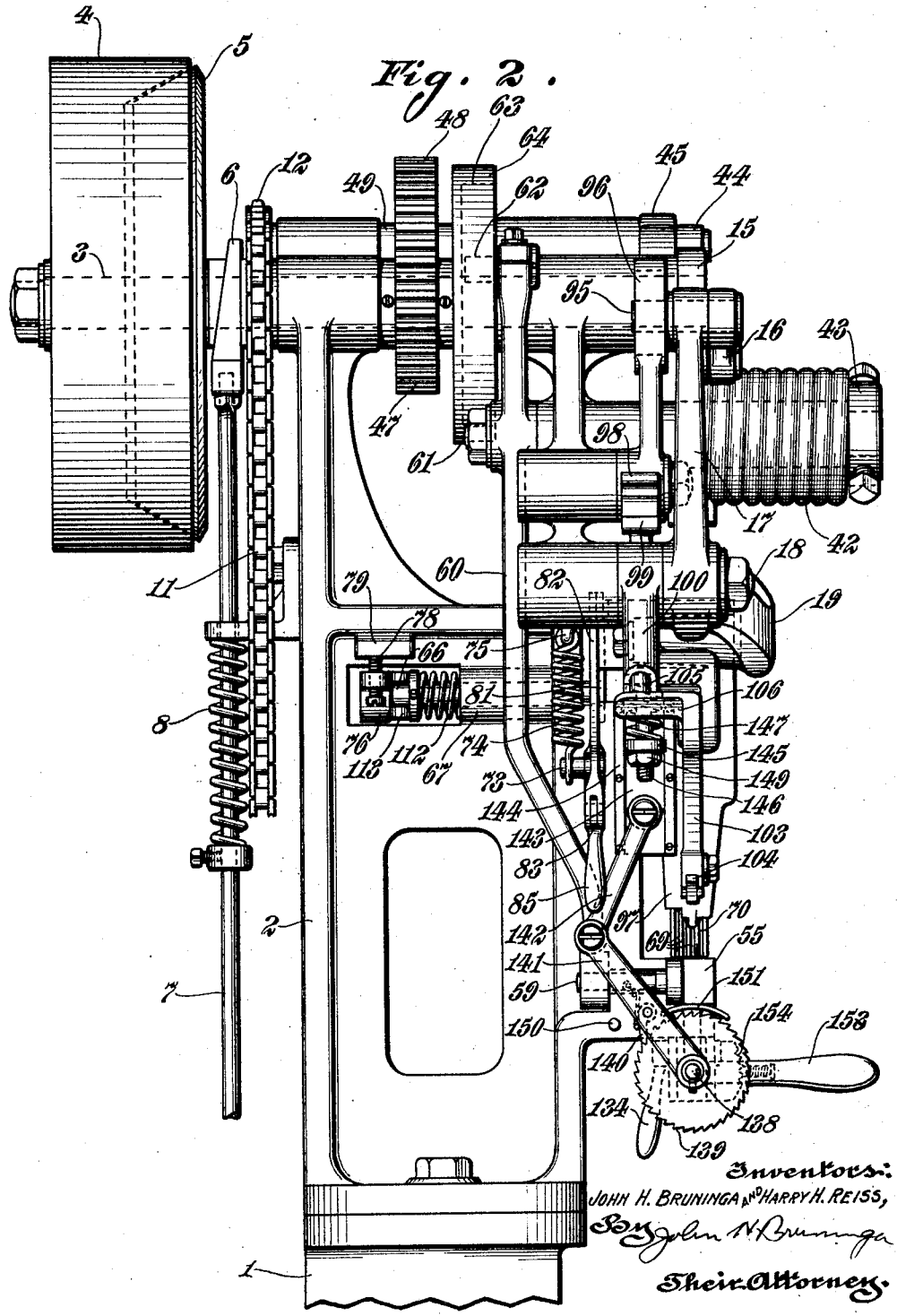

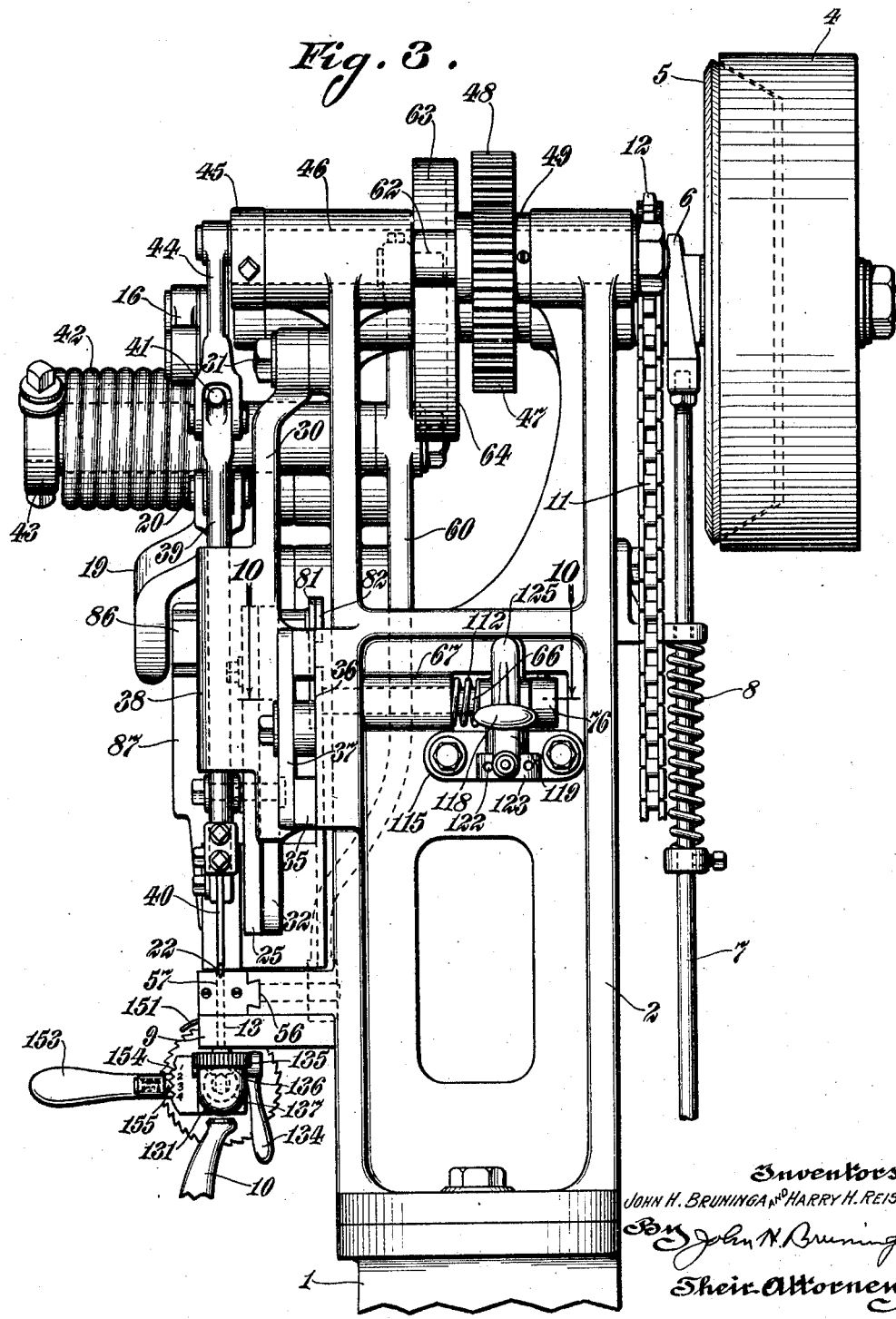

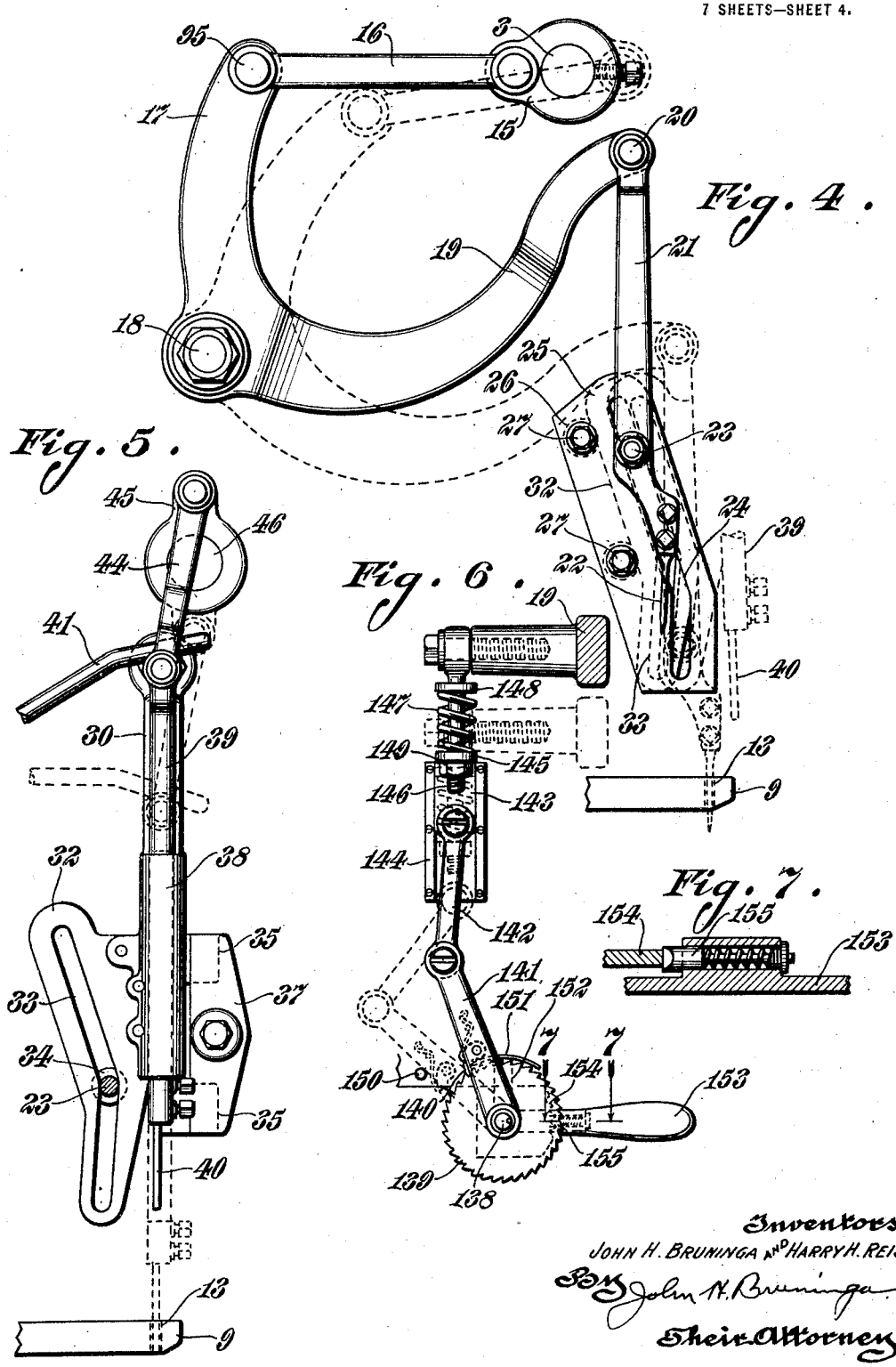

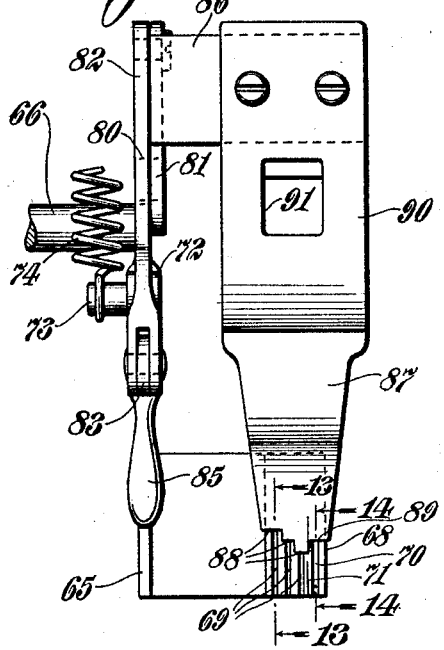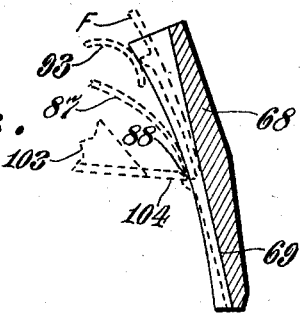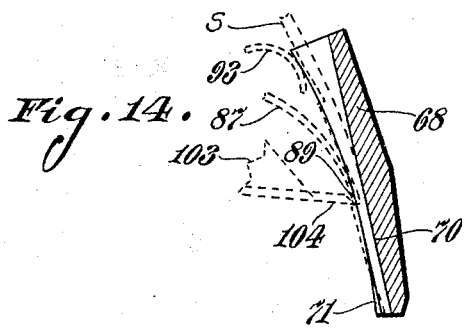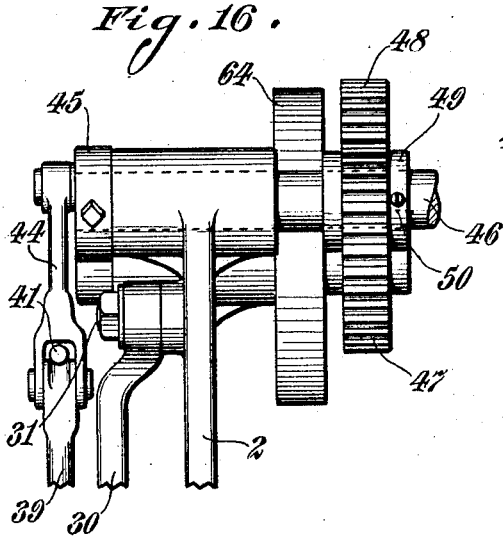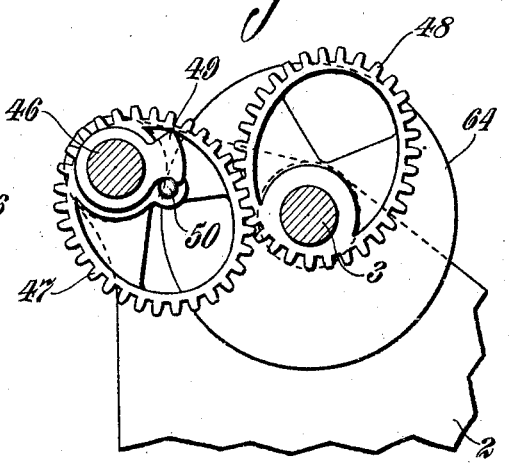

J. H. BRUNINGA AND H. H. REISS.
FASTENER AND SLUG INSERTING MACHINE.
APPLICATION FILED NOV. 15, 1918.
1,394,468.
Patented Oct. 18, 1921.
7 SHEETS—SHEET 7.
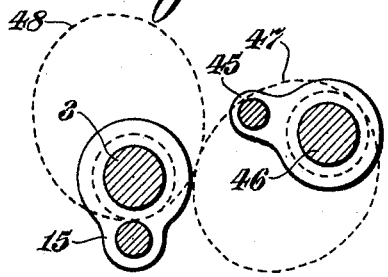
*Fig. 17.*
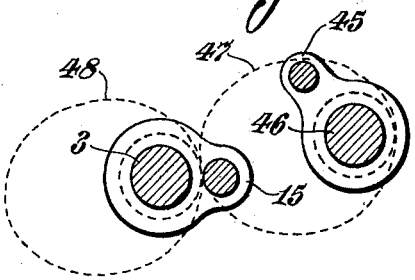
*Fig. 18.*
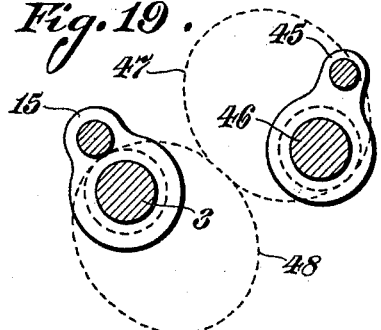
*Fig. 19.*
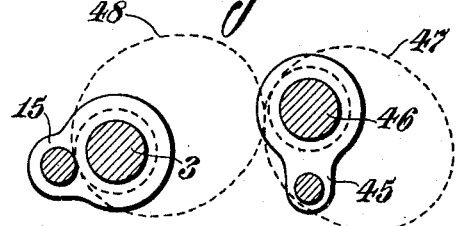
*Fig. 20.*
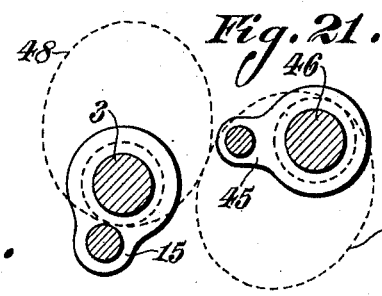
*Fig. 21.*
*Fig. 22.*
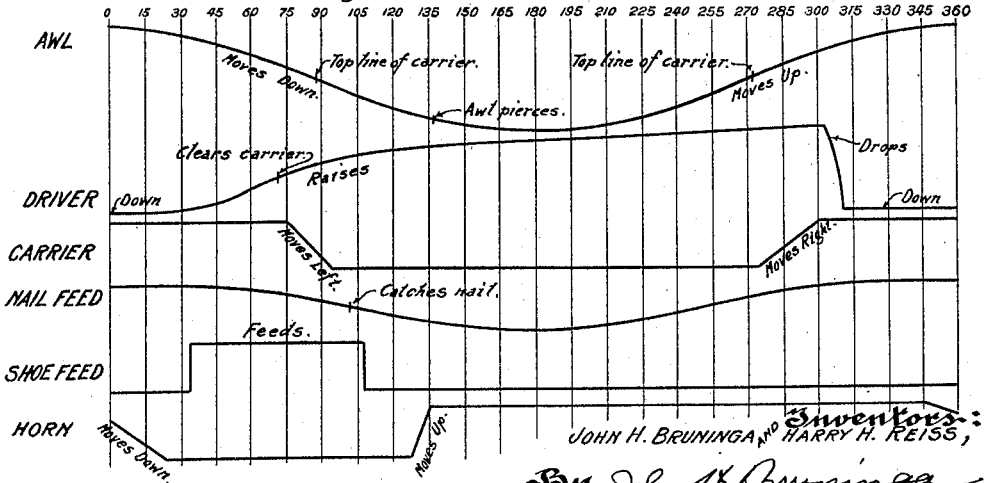
Inventors:
JOHN H. BRUNINGA and HARRY H. REISS,
By John H. Bruninga
Their Attorney.

UNITED STATES PATENT OFFICE.

JOHN H. BRUNINGA AND HARRY H. REISS, OF ST. LOUIS, MISSOURI, ASSIGNORS TO CHAMPION SHOE MACHINERY COMPANY, OF ST. LOUIS, MISSOURI, A CORPORATION OF MISSOURI.

FASTENER AND SLUG INSERTING MACHINE.

1,394,468.  Specification of Letters Patent.  Patented Oct. 18, 1921.

Application filed November 15, 1918. Serial No. 262,697.

*To all whom it may concern:*

Be it known that we, JOHN H. BRUNINGA and HARRY H. REISS, both citizens of the United States, and residing at St. Louis, in the State of Missouri, have invented a certain new and useful Improvement in Fastener and Slug Inserting Machines, of which the following is a specification.

This invention relates to machines for inserting fasteners and slugs, and more particularly, to machines utilizing fastener or slug stock in the form of strings of connected fasteners or slugs, the machine being particularly adapted for operation on boots and shoes.

One of the objects of this invention, therefore, is to provide a string nailing machine in which the throat forms a presser foot positioned in the line of drive with a coöperating movable work support to clamp the work against the throat, together with an awl and driver movable into and out of the line of drive to pierce the work and drive the nail, and suitable means for feeding and cutting the strings of connected nails, so as to position in the line of drive, a cut nail to be driven by the driver.

Another object is to provide a machine utilizing strings of connected fasteners and connected slugs, which is so constructed and arranged as to permit the formation from a fastener string or slug string of a fastener or slug, and the driving of such a formed fastener or slug into the work.

Further objects will appear from the detail description taken in connection with the accompanying drawings, in which:

Figure 1 is a side elevation of a machine embodying this invention;

Fig. 2 is a rear elevation;

Fig. 3 is a front elevation;

Fig. 4 is a detail of the awl mechanism;

Fig. 5 is a detail of the driver mechanism;

Fig. 6 is a detail of the work feeding mechanism;

Fig. 7 is an enlarged section on the line 7—7, Fig. 6;

Fig. 8 is a detail of the feeding and cutting mechanism;

Fig. 9 is a detail of the carrier mechanism;

Fig. 10 is a section on the line 10—10, Fig. 3, showing the string nail guide shifting mechanism;

Fig. 11 is a front elevation of Fig. 10, partly in section;

Fig. 12 is a detail on the string nail guide;

Fig. 13 is a section on the line 13—13, Fig. 12, showing the fastener guide groove;

Fig. 14 is a section on the line 14—14, Fig. 12, showing the slug guide groove;

Fig. 15 is a detail of the driver actuating mechanism;

Fig. 16 is a side elevation of Fig. 15; and

Figs. 17 to 22 inclusive are diagrams illustrating the operation of the machine.

Referring to the accompanying drawings, and more particularly to Figs. 1 to 3 inclusive, 1 designates a column on which is mounted a frame 2 forming a machine head which supports the operating mechanisms. This frame has mounted thereon a drive shaft 3 provided with suitable clutch mechanism for starting and stopping the machine, this clutch mechanism being conventionally shown in Figs. 2 and 3, and comprises a loose belt pulley 4, a cone clutch 5, and a clutch shifter 6 operated by a clutch rod 7, controlled by a spring 8 and connected to be operated by a treadle (not shown) at the base of the machine. The frame is provided with a suitable throat 9 which is fixed to the frame and forms a presser foot against which the work is pressed by a horn 10, which is raised by a spring and which is intermittently depressed by suitable mechanism mounted in the column 1 and operated by a chain 11 passing over a sprocket 12 on the main drive shaft. The horn is thus intermittently depressed to permit feed of the work, and during the driving of the fastener or slug, clamps the work against the throat. The throat 9 is provided with a driver passage 13 which is positioned in the line of drive directly above the center of the horn tip and this throat is provided with a retainer 14 for retaining and guiding the nail while it is being driven into the work. In the following description, the term "nail" is used as the generic term to apply to either a fastener or a slug.

The awl mechanism.

Referring to Figs. 1, 2, 3, and 4, fixed to the drive shaft 3 is a crank 15 which is connected by a link 16 with an arm 17 of a bell crank lever pivoted at 18 on the frame 2. The other arm 19 of the bell crank lever has pivoted thereto at 20 an awl bar 21 provided with an awl 22. This awl bar is provided with a cam roll 23 engaging a cam slot 24 in a cam plate 25 supported in spaced relation with respect to the frame 2 by lugs or collars 26 and screws 27. It will be noted that the cam slot extends forwardly and downwardly in an inclined path and then in a vertical path.

During rotation of the drive shaft, the awl bar is reciprocated vertically and the construction is such that the awl will be moved downwardly into the line of drive at the time the point of the awl will be in alinement with the driver passage 13, and thereupon further movement of the awl bar will cause the awl to enter and pass through the driver passage to pierce the work. Upon the return movement of the awl bar, the awl will first raise vertically until it clears the throat and will then be moved backward out of the line of drive.

The driver mechanism.

Referring now to Figs. 1, 2, 3, 5, 15, and 16, 30 designates a support which is pivoted at 31 on the frame 2. This support is provided with a rearwardly extending plate 32 bearing against the right face (Fig. 3) of the cam plate 25 and is provided with a cam groove 33 adapted to receive the cam roll 23 on the awl bar, the cam roll having an enlarged head 34 to retain the awl bar in position and to also retain the cam plates 25 and 32 in engagement. The support 30 is further provided with laterally extending lugs 35 adapted to slide between a forwardly extending lug 36 on the frame and a plate 37 secured in position spaced from the lug. The support 30 is thus guided for movement vertically on the frame.

Formed on the support 30 is a tubular bearing 38 for the driver bar 39, which has mounted in the lower end thereof a driver 40, adapted to move into and out of the throat to drive the nail. This driver is moved downwardly by a spring 41 engaging the upper end of the driver bar, coiled as shown at 42 and fixed to a lug 43 extending laterally from the frame 2.

The driver bar 39 is connected by a link 44 with a crank 45 fixed to a counter-shaft 46 mounted in bearings on the frame 2. Loosely mounted on the counter-shaft 46 is an elliptical gear 47 meshing with a coöperating elliptical gear 48 fixed to the drive shaft 3. Fixed to the counter shaft 46 is a short projecting arm 49 adapted to be engaged by a laterally projecting pin 50 on the gear 47.

During the operation of the machine, the movement of the cam roll 23 on the awl bar will operate to swing the carrier back and forth so as to move the driver into and out of the line of drive. During this movement, the connections comprising the gears 48 and 47, the pin 50 and the arm 49 and the counter shaft 46 and crank 45 and link 44, will operate to reciprocate the driver bar with its attached driver vertically in the tubular bearing 38. It will be noted that as the awl moves into the line of drive, the driver will move out of the line of drive and vice versa, this being accomplished by the single cam roll 23 connected with the awl bar and moving in the cam slots 24 and 33, which respectively control the movement of the awl and driver into and out of the line of drive. The driver is raised by the elliptical gears and during this time, the pin 50 acts upon the arm 49 to retain the countershaft 46 against the tension of the spring 41, which tends to move the driver bar downwardly. As soon as the pin 50 reaches its upper dead center, the tensioned spring acts to quickly move the driver bar downwardly, the driver being at this time in the line of drive. This causes the arm 49 to move away from the pin 50; however, as shown in Figs. 17 to 22 inclusive, the elliptical gears are so positioned with respect to the crank, the pin and the arm, that the speed of the counter shaft 46 is at this time a maximum. The pin 50 will, therefore, again quickly engage the arm 49 so as to again quickly raise the driver out of the throat.

The nail carrier.

With reference to Figs. 1, 2, 3, and 8, 55 designates a nail carrier which is mounted for sliding movement on the frame 2 and on the throat 9, the carrier being provided with a rib 56 engaging a corresponding recess in the frame. The carrier is provided with an aperture 57 for receiving the nail, which is closed by a hardened plate 58 forming one of the cutters for severing the nail from the string. The carrier has a laterally projecting pin 59 which engages a lever 60 pivoted at 61 on the frame and provided at its upper end with a cam roll 62 engaging a cam groove 63 in a cam wheel 64 fixed to the driver shaft 3. The construction is, therefore, such that upon rotation of the driver shaft, the carrier will be reciprocated back and forth. In order to adjust the position of this carrier, the cam roll 62 is mounted eccentrically in the upper end of the lever 60, the upper arm being split so as to clamp the cam roll in the desired adjusted position.

The string nail guiding mechanism.

Referring to Figs. 1, 2, 3, 10, 12, 13, and 14, 65 designates a carrier having a shank 66 mounted in bearing 67 in the frame 2. This carrier has formed thereon or fixed thereto a string nail guide 68, which is provided with a series of grooves 69 for the fastener strings and a groove 70 for the slug string. The guide face opposite the groove 70 is undercut as shown at 71 so as to permit the head end of the slug to project beyond the undercut face, as this slug head end is, of course, not as wide as the head end of a fastener, the fastener string being shown at F and the slug string at S. The carrier 65 is provided with an arm 72 having a laterally projecting pin 73 engaged by a spring 74 anchored on a bearing 75 on the frame 2. This spring 74 operates to move the nail carrier to the left (Fig. 1) and in order to position the nail carrier, the shank 66 has fixed thereto a collar 76 provided with a laterally extending lug 77 having a set screw 78 engaging a laterally projecting lug 79 on the frame. The coöperating stops 78 and 79, therefore, operate to position the guide to aline with the aperture or recess in the nail carrier when this nail carrier is retracted, and this position may be closely adjusted by adjustment of the set screw 78. The nail carrier may, however, be moved to the right (Fig. 1) against the tension of the spring 74, but this spring is a strong spring and acts to firmly hold the nail carrier in position.

Pivoted at 80 on the carrier 65 is an arm 81, which is connected by a link 82 with a crank arm 83 pivoted at 84 on the arm 72 and having an integral handle 85. Attached to a laterally projecting lug 86 on the arm 81 is a plate 87, which is stepped to provide a series of guards 88 overlying the fastener string grooves 69 and to provide a guard 89 overlying the slug string groove 70. These guards provide suitable pawls adapted to engage the head ends of the nail strings and adapted to be engaged by the feeding and cutting member as hereinafter described. It will, of course, be seen that the stepping of the plate 87 permits the fastener string grooves to receive strings of fasteners of different lengths. Overlying the plate 87 is a spring plate 90 which is also attached to the lug 86 and which keeps the guards under tension. These plates are apertured as shown at 91 so as to permit insertion of the nail strings, and attached to the lug 86 is a spring plate 92 which has a rounded extremity 93 bearing against the guide for the purpose of holding the strings in the grooves.

When the parts are in the position as shown in Fig. 1 with the crank arm 83 over center, the guards will be held in engagement with the guide and since these guards are at this time under tension, the parts will be held in locked position. When, however, the handle 85 is moved to the left (Fig. 1), the guides will be swung out of engagement with the guide, thereby permitting ready removal of the string or strings from the guide.

*The feeding and cutting mechanism.*

Referring to Figs. 1, 2, 3 and 8, the connecting pin 95 between the link 16 and the arm 17 is extended laterally to engage an arm 96 pivoted at 97 on the frame and having formed thereon a segment 98 engaging a segment 99 formed on the arm 100 pivoted at 101 on the frame 2. The arm 100 has pivoted thereon at 102 an arm 103 having clamped therein at its free end a sharpened blade 104. A spring pressed plunger 105 sliding in the arm 100 bears against a toe 106 on the arm 103 and operates to hold the blade firmly against the string nail guide.

Upon rotation of the drive shaft, the crank 15 will operate through the connections just described to oscillate the arm 100. This will move the arm 103 with the blade 104 as shown in Fig. 8. This blade freely moves along the guide until it engages the head of a nail on the string and the string will then be moved down until its top face is flush with the top face of the carrier, which is at this time positioned to receive the end nail. During this feeding movement, the spring 74 will hold the carrier firmly in position and with the stops 78 and 79 in engagement; after, however, the cutter has moved down on the nail guide to the limit of its downward movement when it engages the top face of the carrier, further movement of the drive shaft and further movement of the arm 103 will cause the blade 104 to move to the right along the top face of the carrier, thereby moving the nail guide with the toe to the right and causing the blade to coöperate with the plate 58 to cut the end nail from the string. It will, therefore, be seen that the feeding and cutting means operates to engage the head of a nail on the string and to feed the nail into the carrier until the top face of the nail head is at the cutting point and flush with the top face of the carrier; the feeding and cutting member then operates to cut the string so positioned so as to position an accurately cut nail in the carrier.

*The nail guide shifting mechanism.*

Referring to Figs. 1, 2, 3, and 10 to 14 inclusive, the collar 76 is held in normal position with the slug guide groove 70 in alinement with the passage in the nail carrier and the feeding and cutting blade 104, by a spring 112 encircling the shank 66 and bearing at one end against the collar and at its other end against the bearing 67. This collar is engaged by a forked arm 113 of a lever pivoted at 114 on a bracket 115, mounted on the frame. The other arm 116 of this lever, has pivoted thereon at 117, a handle 118, so that by manipulation of the handle 118, the lever may be swung on its pivot 114, to shift the shaft 66 endwise, in order to shift the string nail guide 68, so as to aline any selected fastener or slug groove 69, 70, with, and in coöperative relation with respect to, the feeding and cutting blade 104 and the carrier passage 57. In order to lock the actuating lever 116, and, therefore, the string nail guide, in any position of adjustment, the handle 118 is provided with an extension 119, bearing a spring pressed plunger 120, adapted to engage with and enter a series of depressions 122, in a sector 123 on the bracket 115. To firmly hold the plunger 120 in its depression, a spring 124 is provided, which engages at one end with an extension 125 on the arm 118, and at its other end with an extension 126 on the lever arm 116. With this construction the operator can at pleasure, by manipulation of the handle 118, shift the string nail guide to aline any one of the guide grooves in alinement with the feeding and cutting blade and the carrier passage, and the parts will be locked in any position of adjustment.

The work feeding mechanism.

Referring to Figs. 1, 2, 3, 6 and 7, mounted to slide in a bracket 130 below the throat 9 is a carrier 131 which is provided with rack teeth 132 engaged by a gear 133 on the shaft frictionally held in the bracket 130 and provided with an arm 134. With this construction, movement of the handle 134 will shift the carrier 131 toward and from the driver passage, the frictional connection being such as to firmly hold the carrier in any position of adjustment.

Mounted in the carrier 131 is a knurled wheel 135 which projects beyond the carrier and is positioned directly underneath the throat forming the presser foot. This wheel is mounted for free rotation and is provided with a bevel gear 136 meshing with a bevel gear 137 on a shaft 138 mounted in the carrier. This shaft has a splined connection with a ratchet 139 mounted on the bracket against endwise movement. This ratchet is engaged by a pawl 140 on an arm 141 connected by a link 142 with a slide 143 mounted in a guide way 144 on the frame. The slide 143 has a laterally projecting lug 145 through which projects a link 146 connected with the arm 19 for operating the awl. The spring 147 is interposed between which a collar 148 on the link 146 and the lug 145 and this link is further provided with a nut 149.

The arm 141 is arrested by a stop 150 on the frame 2, while the ratchet is partially covered by a guard 151 mounted on the arm 152 freely movable on the shaft 138 and provided with a handle 153, which moves over a notched segment 154 on the bracket 130 and is provided with a spring pressed latch 155 engaging the notches in the segment.

During the operation of the machine, the oscillation of the awl actuating arm 19 will cause the arm 141 to intermittently move the ratchet 139 step by step. The downward movement of the arm 141 is limited by the stop 150, the spring 147 yields during any access movement. The stroke of the arm is, of course, varied by the position of the guard 151 as the pawl 140 does not engage the ratchet until the pawl leaves the guard. By shifting the guard by means of the handle 153, the pawl can be made to engage the ratchet earlier or later in its oscillation, so that the movement of the ratchet can thereby be varied. The movement of the ratchet is, of course, communicated to the knurled wheel 145, so that this wheel is moved step by step to feed the work, this wheel engaging the edge of the sole of the shoe clamped between the horn and the presser foot. The feeding movement of the work can, therefore, be varied by shifting the arm 153.

Résumé of operations.

Referring to the drawings, and more particularly to the diagrams shown in Figs. 17 to 22 inclusive, and starting with the awl up, the driver down, the carrier with its passage in the line of drive, the feeding and cutting member up in engagement with the guard on the nail guide, the work feeding mechanism in position where the pawl is on its guard and with the horn raised, the operations will be as follows.

The horn is depressed and the work feeding mechanism immediately comes into action to feed the work. The awl now moves down while the driver moves up. As soon as the driver has cleared the top face of the nail carrier the latter is moved back to position its passage in alinement with the nail guide. As the awl carrying shank moves down, the awl will be moved into the line of drive and the awl moves through the driver passage to pierce the work, the horn having been released at this time, and after the feed of the shoe has been completed, to clamp the work against the presser foot. During this movement, the string nail will have been fed into the passage in the carrier, and during the awl piercing movement, the string positioned in the carrier will be cut to position a cut nail in this carrier. The awl will now again move back to clear the throat and also to clear the path of the carrier, and the feeding and cutting blade having been moved back, the carrier is now moved into the line of drive and immediately thereafter, the driver drives the nail positioned in the line of drive. This completes the cycle of operations.

In order to adjust the machine for either fastening or slugging operations, it is necessary not only to shift the string nail guide but also to shift the work feeding mechanism for fastening or for slugging operations. The string nail guide is shifted to position any selected fastener guide groove and with respect to the carrier; the work feeding mechanism is, however, also shifted or controlled, so as to correspond to supply of the nail to nail guide.

It will, therefore, be seen that the invention accomplishes its objects. A string nailing machine is produced which utilizes strings of connected fasteners and slugs, in which machine, the throat can be stationary while the awl, driver and carrier move into and out of the line of drive. The parts are so constructed, arranged and coördinated as to selectively permit the formation from a selected fastener string or slug string of a fastener or slug and permit the driving of a formed fastener or slug into the work. The nail guide has a special construction adapting it for guiding strings of connected fasteners and a string of connected slugs and this nail guide is so constructed and so coördinated with the feeding mechanism and the carrier as to permit a selected fastener string or a selected slug string to be shifted at will in the line of drive, to permit the feeding of either a selected fastener string or a selected slug string and the positioning of a selected fastener or slug in the throat.

It is obvious that various changes may be made in the details of construction, without departing from the spirit of this invention; it is, therefore, to be understood that this invention is not to be limited to the specific construction shown and described.

Having thus described the invention, what is claimed is:

1. In a string-nailing machine, the combination with a frame and a driver thereon, of a throat positioned in the line of drive, a guide for a string of connected nails, a movable nail-receiving member, feeding and cutting means constructed and arranged to engage the head of a nail on the string and feed the string into said nail-receiving member, and constructed and arranged to cut the string to position a cut nail in the said nail-receiving member, means for moving said nail-receiving member to position the nail therein in the line of drive, and work feeding and puncturing means, including an awl, coöperating with said other elements to feed the work and to form a puncture therein in the line of drive.

2. In a string-nailing machine, the combination with a frame and a driver thereon, of a throat positioned in the line of drive, a guide for a string of connected nails, a movable nail-receiving member, feeding and cutting means constructed and arranged to engage the head of a nail on the string and feed the string into said nail-receiving member, and constructed and arranged to coöperate with said nail-receiving member to cut the string to position a cut nail in the said nail-receiving member, means for moving said nail-receiving member to position the nail therein in the line of drive, and work feeding and puncturing means, including an awl, coöperating with said other elements to feed the work and to form a puncture therein in the line of drive.

3. In a string-nailing machine, the combination with a frame and a driver thereon, of a throat positioned in the line of drive, a guide for a string of connected nails, a movable nail-receiving member, a feeding and cutting member constructed and arranged to engage the head of a nail on the string and feed the string into said nail-receiving member and then cut the string to position a cut nail in said nail-receiving member, means for moving said nail-receiving member to position the nail therein in the line of drive, and work feeding and puncturing means, including an awl, coöperating with said other elements to feed the work and to form a puncture therein in the line of drive.

4. In a string-nailing machine, the combination with a frame and a driver thereon, of a throat positioned in the line of drive, a guide for a string of connected nails, a movable nail-receiving member, a feeding and cutting member constructed and arranged to engage the head of a nail on the string and feed the string into said nail-receiving member and then coöperate with said nail-receiving member to cut the string to position a cut nail in said nail-receiving member, means for moving said nail-receiving member to position the nail therein in the line of drive, and work feeding and puncturing means, including an awl, coöperating with said other elements to feed the work and to form a puncture therein in the line of drive.

5. In a string-nailing machine, the combination with a nail-guiding throat positioned in the line of drive, of a driver, a guide for a string of connected nails, a nail carrier, feeding and cutting means, adapted to engage the head of a nail on the string and feed the string into said carrier, and adapted to cut the string, adapted to position a cut nail in said carrier, and means for moving said carrier with the nail therein into the line of drive to be driven by said driver.

6. In a string-nailing machine, the combination with a nail-guiding throat positioned in the line of drive, of a driver, a guide for a string of connected nails, a nail carrier, feeding and cutting means, adapted to engage the head of a nail on the string and feed the string into said carrier with the head at the cutting point, and adapted to cut the string, adapted to position a cut nail in said carrier, and means for moving said carrier with the nail therein into the line of drive to be driven by said driver.

7. In a string-nailing machine, the combination with a nail-guiding throat positioned in the line of drive, of a driver, a guide for a string of connected nails, a nail carrier, feeding and cutting means, adapted to engage the head of a nail on the string and feed the string into said carrier, and adapted to coöperate with said carrier to cut the string, adapted to position a cut nail in said carrier, and means for moving said carrier with the nail therein into the line of drive to be driven by said driver.

8. In a string-nailing machine, the combination with a nail-guiding throat positioned in the line of drive, of a driver, a guide for a string of connected nails, a nail carrier movable into and out of the line of drive, feeding and cutting means, adapted to engage the head of a nail on the string and feed the string into said carrier while out of the line of drive, and adapted to coöperate with said carrier to cut the string, adapted to position a cut nail in said carrier, and means for moving said carrier with the nail therein into the line of drive to be driven by said driver.

9. In a string-nailing machine, the combination with a nail-guiding throat positioned in the line of drive, of an awl, a driver, a nail carrier, feeding and cutting means, adapted to engage the head of a nail on the string and feed the string into said carrier, and adapted to cut the string, adapted to position a cut nail in said carrier, means for moving said carrier with the nail therein into the line of drive to be driven by said driver, and means for moving said awl into and out of the line of drive.

10. In a string-nailing machine, the combination with a nail-guiding throat positioned in the line of drive, of an awl, a driver, a nail carrier, feeding and cutting means, adapted to engage the head of a nail on the string and feed the string into said carrier, and adapted to cut the string, adapted to position a cut nail in said carrier, means for moving said carrier with the nail therein into the line of drive to be driven by said driver, and means for moving said awl and said driver into and out of the line of drive.

11. In a string-nailing machine, the combination with a nail-guiding throat positioned in the line of drive, of a driver, a guide for a string of connected nails, a nail carrier, a feeding and cutting member, adapted and operated to engage the head of a nail on the string to feed the string into said carrier and then cut the string, adapted to position a cut nail in said carrier, and means for moving said carrier with the nail therein into the line of drive to be driven by said driver.

12. In a string-nailing machine, the combination with a nail-guiding throat positioned in the line of drive, of a driver, a guide for a string of connected nails, a nail carrier, a feeding and cutting member, adapted and operated to engage the head of a nail on the string to feed the string into said carrier with the head at the cutting point and then cut the string, adapted to position a cut nail in said carrier, and means for moving said carrier with the nail therein into the line of drive to be driven by said driver.

13. In a string-nailing machine, the combination with a nail-guiding throat positioned in the line of drive, of a driver, a guide for a string of connected nails, a nail carrier, a feeding and cutting member, adapted and operated to engage the head of a nail on the string to feed the string into said carrier and then coöperate with said carrier to cut the string, adapted to position a cut nail in said carrier, and means for moving said carrier with the nail therein into the line of drive to be driven by said driver.

14. In a string-nailing machine, the combination with a nail-guiding throat positioned in the line of drive, of an awl, a driver, a nail carrier, feeding and cutting means, adapted to engage the head of a nail on the string and feed the string into said carrier, and adapted to cut the string, adapted to position a cut nail in said carrier, means for moving said carrier with the nail therein into the line of drive to be driven by said driver, and means for moving said awl into and through said throat to pierce the work.

15. In a string-nailing machine, the combination with a nail-guiding throat positioned in the line of drive, of an awl, a driver, a nail carrier, feeding and cutting means, adapted to engage the head of a nail on the string and feed the string into said carrier, and adapted to cut the string, adapted to position a cut nail in said carrier, means for moving said carrier with the nail therein into the line of drive to be driven by said driver, and means for moving said awl and said driver into said throat, adapted to pierce the work and drive the nail.

16. In a string-nailing machine, the combination with a nail-guiding throat positioned in the line of drive, of an awl, a driver, a nail carrier movable into and out of the line of drive, feeding and cutting means, adapted to engage the head of a nail on the string and feed the string into said carrier while out of the line of drive, and adapted to cut the string, adapted to position a cut nail in said carrier, means for moving said carrier with the nail therein into the line of drive to be driven by said driver, and means for moving said awl into and out of the line of drive.

17. In a string-nailing machine, the combination with a nail-guiding throat positioned in the line of drive, of an awl, a driver, a nail carrier movable into and out of the line of drive, feeding and cutting means, adapted to engage the head of a nail on the string and feed the string into said carrier while out of the line of drive, and adapted to cut the string, adapted to position a cut nail in said carrier, means for moving said carrier with the nail therein into the line of drive to be driven by said driver, and means for moving said awl into and through said throat, adapted to pierce the work.

18. In a string-nailing machine, the combination with a support, of a nail-guiding throat mounted thereon and positioned in the line of drive, a movable work support coöperating with said throat to clamp the work, an awl, a driver, means for movably sustaining said awl and said driver separately on said support, adapted to position them alternately in the line of drive, and means for operating said awl and said driver, adapted to move them into said throat to pierce the work and drive the nail.

19. In a string-nailing machine, the combination with a support, of a nail-guiding throat mounted thereon and positioned in the line of drive, a movable work support coöperating with said throat to clamp the work, an awl, a driver, a nail carrier, means for movably sustaining said awl, said driver and said carrier separately on said support, adapted to position them in the line of drive, and work feeding mechanism positioned below said throat and adapted to engage the work.

20. In a string-nailing machine, the combination with a support, of a nail-guiding throat mounted thereon and positioned in the line of drive, a movable work support coöperating with said throat to clamp the work, an awl, a driver, a nail carrier, means for movably sustaining said awl, said driver and said carrier separately on said support, means for positioning said awl, and said carrier with said driver, alternately in the line of drive, and work feeding mechanism positioned below the throat and adapted to engage the work.

21. In a string-nailing machine, the combination with a nail-guiding throat positioned in the line of drive, of an awl, a driver, a guide for a string of connected nails, feeding and cutting means, adapted to engage the head of a nail on the string and feed the string, adapted to cut the string, and adapted to position a cut nail in said throat, and means for operating said awl and said driver, adapted to move them alternately in the line of drive to pierce the work and drive the nail.

22. In a string-nailing machine, the combination with a nail-guiding throat positioned in the line of drive, of an awl, a driver, a guide for a string of connected nails, feeding and cutting means, adapted to engage the head of a nail on the string and feed the string, adapted to cut the string, and adapted to position a cut nail in said throat, and means for operating said awl and said driver, adapted to move them alternately into said throat to pierce the work and drive the nail.

23. In a string-nailing machine, the combination with a nail-guiding throat positioned in the line of drive, of an awl, a driver, a guide for a string of connected nails, feeding and cutting means, adapted to engage the head of a nail on the string and feed the string, adapted to cut the string, and adapted to position a cut nail in said throat, and means for moving said awl and said driver alternately into the line of drive and for operating said awl and said driver to pierce the work and drive the nail.

24. In a string-nailing machine, the combination with a nail-guiding throat positioned in the line of drive, of an awl, a driver, a guide for a string of connected nails, a nail carrier, feeding and cutting means, adapted to engage the head of a nail on the string and feed the string into said carrier, and adapted to cut the string, adapted to position a cut nail in said carrier, and means for moving said awl, said driver and said carrier into and out of the line of drive.

25. In a string-nailing machine, the combination with a nail-guiding throat positioned in the line of drive, of an awl, a driver, a guide for a string of connected nails, a nail carrier, feeding and cutting means, adapted to engage the head of a nail on the string and feed the string into said carrier, and adapted to cut the string, adapted to position a cut nail in said carrier, means for positioning said awl, said driver and said carrier in the line of drive, and means for operating said awl and said driver to pierce the work and drive the nail.

26. In a string-nailing machine, the combination with a nail-guiding throat positioned in the line of drive, of an awl, a driver, a guide for a string of connected nails, a nail carrier, feeding and cutting means, adapted to engage the head of a nail on the string and feed the string into said carrier, and adapted to cut the string, adapted to position a cut nail in said carrier, means for positioning said awl, and said carrier with said driver, alternately in the line of drive, and means for operating said awl and said driver to pierce the work and drive the nail.

27. In a string-nailing machine, the combination with a nail-guiding throat positioned in the line of drive, of an awl, a driver, a guide for a string of connected nails, a nail carrier, feeding and cutting means, adapted to engage the head of a nail on the string and feed the string into said carrier, and adapted to cut the string, adapted to position a cut nail in said carrier, means for moving said awl, said driver and said carrier into and out of the line of drive, and work feeding mechanism coöperating with said other elements to feed the work.

28. In a string-nailing machine, the combination with a nail-guiding throat positioned in the line of drive, of an awl, a driver, a guide for strings of connected nails, feeding and cutting means, adapted to selectively feed and cut the strings, and adapted to position a selected cut nail in said throat, and means for operating said awl and said driver, adapted to move them alternately in the line of drive to pierce the work and drive the nail.

29. In a string-nailing machine, the combination with a nail-guiding throat positioned in the line of drive, of an awl, a driver, a guide for strings of connected nails, feeding and cutting means, adapted to selectively feed and cut the strings, and adapted to position a selected cut nail in said throat, means for shifting said guide, adapted to position a selected string, and means for operating said awl and said driver, adapted to move them alternately in the line of drive to pierce the work and drive the nail.

30. In a string-nailing machine, the combination with a nail-guiding throat positioned in the line of drive, of an awl, a driver, a guide for strings of connected nails, a carrier movable into and out of the line of drive, feeding and cutting means, adapted to selectively feed and cut said strings, and adapted to position a cut nail in said carrier, and means for operating said awl and said driver, adapted to move them alternately in the line of drive to pierce the work and drive the nail.

31. In a string-nailing machine, the combination with a nail-guiding throat positioned in the line of drive, of an awl, a driver, a guide for strings of connected nails, a carrier movable into and out of the line of drive, feeding and cutting means, adapted to selectively feed and cut the strings, and adapted to position a cut nail in said carrier, means for shifting said guide, adapted to position a selected string, and means for operating said awl and said driver, adapted to move them alternately in the line of drive to piece the work and drive the nail.

32. In a string-nailing machine, the combination with a nail-guiding throat positioned in the line of drive, of an awl, a driver, a guide for strings of connected fasteners and connected slugs, feeding and cutting means, adapted to selectively feed and cut said strings, and adapted to position a cut fastener or a cut slug in said throat, and means for operating said awl and said driver, adapted to move them alternately in the line of drive to pierce the work and drive the nail.

33. In a string-nailing machine, the combination with a nail-guiding throat positioned in the line of drive, of an awl, a driver, a guide for strings of connected fasteners and connected slugs, feeding and cutting means, adapted to selectively feed and cut said strings, and adapted to position a cut fastener or a cut slug in said throat, means for shifting said guide, adapted to position a selected fastener string or a selected slug string, and means for operating said awl and said driver, adapted to move them alternately in the line of drive to pierce the work and drive the nail.

34. In a string-nailing machine, the combination with a nail-guiding throat positioned in the line of drive, of an awl, a driver, a guide for strings of connected nails, feeding and cutting means, adapted to selectively feed and cut said strings, and adapted to position a selected cut nail in said throat, means for operating said awl and said driver, adapted to move them alternately in the line of drive to pierce the work and drive the nail, and work feeding mechanism adjustable in accordance with the selection of said strings.

35. In a string-nailing machine, the combination with a nail-guiding throat positioned in the line of drive, a driver, a guide for strings of connected fasteners and connected slugs, feeding and cutting means, adapted to selectively feed and cut said strings, and adapted to position a cut fastener or a cut slug in said throat, means for operating said awl and said driver, adapted to move them alternately in the line of drive to pierce the work and drive the nail, and work feeding mechanism adjustable in acordance with the selection of said strings.

In testimony whereof we affix our signatures this 12th day of July, 1918.

JOHN H. BRUNINGA.
HARRY H. REISS.